(12) United States Patent
Noorizadeh et al.

(10) Patent No.: US 12,278,926 B2
(45) Date of Patent: Apr. 15, 2025

(54) CALL CENTER VOICE SYSTEM FOR USE WITH A REAL-TIME COMPLAINT IDENTIFICATION SYSTEM

(71) Applicant: Bank of America Corporation, Charlotte, NC (US)

(72) Inventors: Emad Noorizadeh, Plano, TX (US);
Sushil Golani, Charlotte, NC (US);
Chris Welles, Charlotte, NC (US);
Emmanuel Dibia, Dallas, TX (US);
Jennifer Russell, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 198 days.

(21) Appl. No.: 18/144,925

(22) Filed: May 9, 2023

(65) Prior Publication Data

US 2024/0380842 A1 Nov. 14, 2024

(51) Int. Cl.
*H04M 3/493* (2006.01)
*H04M 3/42* (2006.01)

(52) U.S. Cl.
CPC ..... *H04M 3/4936* (2013.01); *H04M 3/42221* (2013.01); *H04M 2201/40* (2013.01)

(58) Field of Classification Search
CPC ........... H04M 3/4936; H04M 3/42221; H04M 2201/40; H04M 3/5175
See application file for complete search history.

(56) References Cited

U.S. PATENT DOCUMENTS

| | | | |
|---|---|---|---|
| 11,563,852 B1 * | 1/2023 | Can ..................... | H04M 3/5175 |
| 2017/0111515 A1 * | 4/2017 | Bandyopadhyay ......................... H04W 12/128 |  |
| 2020/0404094 A1 * | 12/2020 | Roderick .......... | H04M 3/42221 |
| 2021/0125612 A1 * | 4/2021 | Coman ................. | G06N 3/045 |
| 2021/0141879 A1 * | 5/2021 | Calahan .................. | G06F 21/32 |
| 2021/0314282 A1 * | 10/2021 | Sharma ................... | G06F 3/167 |
| 2022/0319523 A1 * | 10/2022 | Arya ....................... | G10L 17/26 |
| 2024/0205330 A1 * | 6/2024 | Hodges ............. | H04M 3/42221 |

* cited by examiner

*Primary Examiner* — Akelaw Teshale
(74) *Attorney, Agent, or Firm* — Weiss & Arons LLP

(57) ABSTRACT

An interactive voice response system for use with a real-time complaint identification system and dashboard may be provided. The interactive voice response system may receive and respond to human callers in real-time. Simultaneously, the interactive voice response system may use a model to transcribe the audio call and identify complaints within the audio calls. Identified complaints may be resolved by one of a plurality of resolution executables. One of the resolution executables may include registering the identified complaint with a complaint register.

18 Claims, 5 Drawing Sheets

REAL-TIME CUSTOMER COMPLAINT PROCESSING ARCHITECTURE

CALL CENTER VOICE SYSTEM FOR USE WITH A REAL-TIME COMPLAINT IDENTIFICATION SYSTEM

FIELD OF TECHNOLOGY

Aspects of the disclosure relate to interactive voice response systems.

BACKGROUND OF THE DISCLOSURE

Many times, an interactive voice response system may have difficulty differentiating between various categories of customer communications. For example, an interactive voice response system may have difficulty distinguishing between a complaint, in which a customer expresses negative sentiment, and typical issues, in which a customer expresses a typical repair request. Therefore, it would be desirable to supplement an interactive voice response system with a complaint differentiation and sentiment model.

It would be further desirable for the complaint differentiation and sentiment model to efficiently distinguish between customer complaints as either a complaint or a repair request.

It would be yet further desirable for the interactive voice response system to register and respond to complaints as "complaints" and register and respond to the repair requests as "repair requests."

SUMMARY OF THE DISCLOSURE

With real-time interactions between a human client and a hardware processor-based interactive voice response system, it may be important to detect issues that may drive negative client sentiment. Additionally, early detection of issues driving negative sentiment can improve client satisfaction. An interactive voice response system supplemented by a complaint differentiation and sentiment model may be provided. The interactive voice response system supplemented by the complaint differentiation and sentiment model may operate the following process in real-time: an audio conversation may be transmitted to an automatic speech recognition ("ASR") system, or speech to text system. The ASR system may transmit a transcription of the audio conversation to the complaint differentiation and sentiment model. The complaint differentiation and sentiment model may analyze and process the complaint. The complaint differentiation and sentiment model may transmit the analyzed and processed data to an insight dashboard. The insight dashboard may display the analyzed and processed data regarding the complaint sentiment of the conversation on a dashboard in real-time.

The complaint differentiation and sentiment model may consider, in real-time, the content of the complaint itself and metadata relating to the complaint (including voice and volume). The complaint differentiation and sentiment model may also consider a plurality of previously-made calls and determine whether this complaint is related to a complaint that has been registered by multiple users. The model may be able to register a complaint without requiring input from a user. The model may also be able to schedule a follow-up communication, such as an email or call, to an unhappy customer.

Upon completion of a call, the model may create a summary of the call including a cause, problem and solution. The summary of the call may be forwarded to various stakeholders, such as the caller, or a department related to a topic of the call.

The model may also notify a subdivision, within an entity, associated with the complaint. For example, a summary of a complaint related to a credit card may be forwarded to an entity's credit card department.

The complaint differentiation and sentiment model may also consider, in real-time, topics of the call, patterns of the call, sequential call pattern analysis and conversation anomalies.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
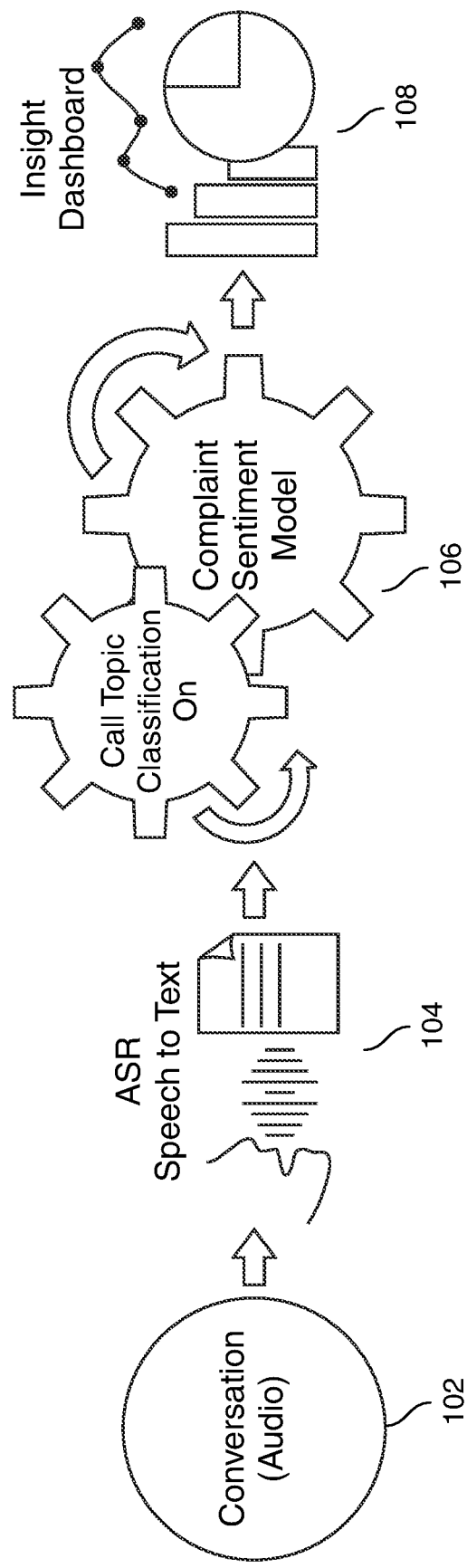
FIG. 1 shows an illustrative diagram in accordance with principles of the disclosure.

Apparatus and methods for an interactive voice response system is provided. The interactive voice response system may be supplemented by a complaint differentiation and sentiment model.

The interactive voice response system may include a transceiver unit. The transceiver unit may be operable to receive and respond to audio calls.

The interactive voice response system may also include an automatic speech recognition ("ASR") system. The ASR system may be operable to receive audio calls from the transceiver unit. The ASR system may also be operable to transmit the transcribed audio calls to the complaint differentiation and sentiment model.

The complaint differentiation and sentiment model may be an artificially-intelligent model that analyzes complaints. The complaint differentiation and sentiment model may operate in real-time. As such, while a conversation is taking place between a human caller and the interactive voice response system, the ASR may be transcribing the call and the complaint differentiation and sentiment model may analyze the call for complaints.

The complaint differentiation and sentiment model may analyze the transcribed audio calls for complaints. In order to identify whether an audio call includes a complaint, the model may identify or consider some or all of the following elements: the content of the audio call, metadata relating to the call (such as, for example, voice pitch and voice volume), inter-conversational gap as it trends through a call (gap between human utterance and system response), a plurality of historical calls relating to a plurality of users, a plurality of historical calls relating to the current caller, information relating to where the current call plots on the caller's legacy call/complaint behavior and content of transcribed calls being registered by multiple users. It should be noted that increasing voice pitch and voice volume as it trends through a call may be associated with negative sentiment, such as a complaint. It should also be noted that decreasing inter-conversational gap as it trends through a call may be also be associated with negative sentiment, such as a complaint.

The complaint differentiation and sentiment model may determine whether the transcribed audio call indicated a complaint. The complaint differentiation and sentiment model may be able to, based on the elements described above, differentiate between a complaint and a repair request. A complaint may be identified as a request in which a caller demonstrates dissatisfaction and/or in which the caller indicated that the reason for the call was not resolved. A repair request may be identified as a request in which a caller is requesting a resolvable request.

The complaint differentiation and sentiment model may process the transcribed audio calls and identify a first plurality of call components. The first plurality of call components may include one or more of the elements described above.

The complaint differentiation and sentiment model may transmit the transcribed audio calls that indicated a complaint and the first plurality of call components to an insight dashboard. The insight dashboard may be a graphical user interface ("GUI") in which one or more agents and/or callers may be able to view the sentiment and metadata relating to one call or a plurality of calls.

The insight dashboard may be operable to display data relating to the transcribed audio calls. The insight dashboard may be operable to aggregate the first plurality of call components to a second plurality of call components already-stored at the insight dashboard. The insight dashboard may be operable to display the second plurality of call components.

At times, the complaint differentiation and sentiment model may be further operable to register the transcribed audio calls that indicated complaints with a complaint register. The complaint register may be stored within the complaint differentiation and sentiment model. The registration may be absent any interaction from a user that initiated the voice call. Legacy complaint registration may involve a caller initiating a complaint using a website, application, phone call or other suitable approach. However, the complaint differentiation and sentiment model may completely automate the complaint registration process.

The complaint differentiation and sentiment model may initiate a follow-up communication with the user that initiated the voice call that indicated the complaint. The follow-up communication may be an email, telephone call, chat or any other suitable communication.

Methods for determining, in real-time, complaint sentiment within conversations between human callers and an interactive voice response system is provided. Methods may include receiving and responding to a plurality of audio calls at a hardware transceiver operating with a hardware processor and hardware memory.

Methods may include transcribing the plurality of audio calls, in real-time, at an automatic speech recognition system. The transcribing may be executed as the plurality of audio calls are received at the hardware transceiver.

Methods may include transmitting the plurality of transcribed audio calls, in real-time, from the automatic speech recognition system to a complaint differentiation and sentiment model. Methods may include analyzing the plurality of transcribed audio calls, in real-time, at the complaint differentiation and sentiment model for a plurality of sentiment factors. The plurality of sentiment factors may include some or all of the following: call content, complaint metadata (such as, for example, voice pitch, voice volume, inter-conversational gap as it trends through the call), a plurality of historical calls and content of transcribed calls being registered by multiple users.

Methods may include registering, absent any interaction from a user that initiated the audio call that indicated complaint, the one or more transcribed audio calls that indicated complaint with a complaint register, the complaint register stored within the complaint differentiation and sentiment model.

Methods may include initiating a follow-up communication with a user that initiated the audio call that indicated complaint. The follow-up communication may be an email, chat, telephone call or any other suitable follow-up communication.

Methods may include determining, based on the plurality of sentiment factors, that one or more transcribed audio calls of the plurality of transcribed audio calls that indicated a complaint in real-time, at the complaint differentiation and sentiment model.

Methods may include retrieving, from the one or more transcribed audio calls, in real-time, a first plurality of call components at the complaint differentiation and sentiment model.

Methods may include transmitting, form the complaint differentiation and sentiment model to an insight dashboard, in real-time, the one or more transcribed audio calls and the first plurality of call components.

Methods may include displaying data, relating to the one or more transcribed audio calls, in real-time, on the insight dashboard.

Methods may include aggregating the first plurality of call components to a second plurality of call components. The second plurality of call components may be stored at the insight dashboard.

Methods may include displaying the second plurality of call components on the insight dashboard.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows the process or receiving a conversation at an interactive voice response system, processing the conversation at the interactive voice response system, identifying complaints within the conversation and displaying the information relating to the conversation and to the identified complaints on an insight dashboard.

An audio conversation may be initiated at an interactive voice response system and/or with a human call center agent. The audio conversation may be recorded in real-time, as shown at 102.

The recorded conversation may be transmitted to an ASR, or speech to text transcription model. The ASR, or speech to text transcription model may transcribe the recorded conversation, as shown at 104. It should be noted that this process may be a real-time process. As such, as the conversation is taking place, the ASR may be transcribing the call.

A call topic classification model may be turned on. When the call topic classification model is turned on, the transcribed conversation may be analyzed and processed by a complaint sentiment model, as shown at 106. When the call topic classification model is turned off, the transcribed conversation may not be analyzed and processed by the complaint sentiment model. The complaint sentiment model may determine the sentiment of the call based on the content of the call and/or based on call metadata. Call metadata may include tone of voice, voice pitch, voice volume and any other suitable call metadata. The complaint sentiment model may determine whether the call includes one or more complaints. A complaint may be characterized as an issue and/or error with an existing functionality. A complaint may also be characterized as a request for escalation of an issue.

Data and metadata relating to the call may be forwarded to an insight dashboard, as shown at 108. The insight dashboard may display information relating to a single call and/or aggregated information relating to multiple calls. Because the process between 102 and 108 may be executed in real-time, the insight dashboard may be updated in real-time based on incoming calls at one or more interactive voice response systems.

Figure 2A:
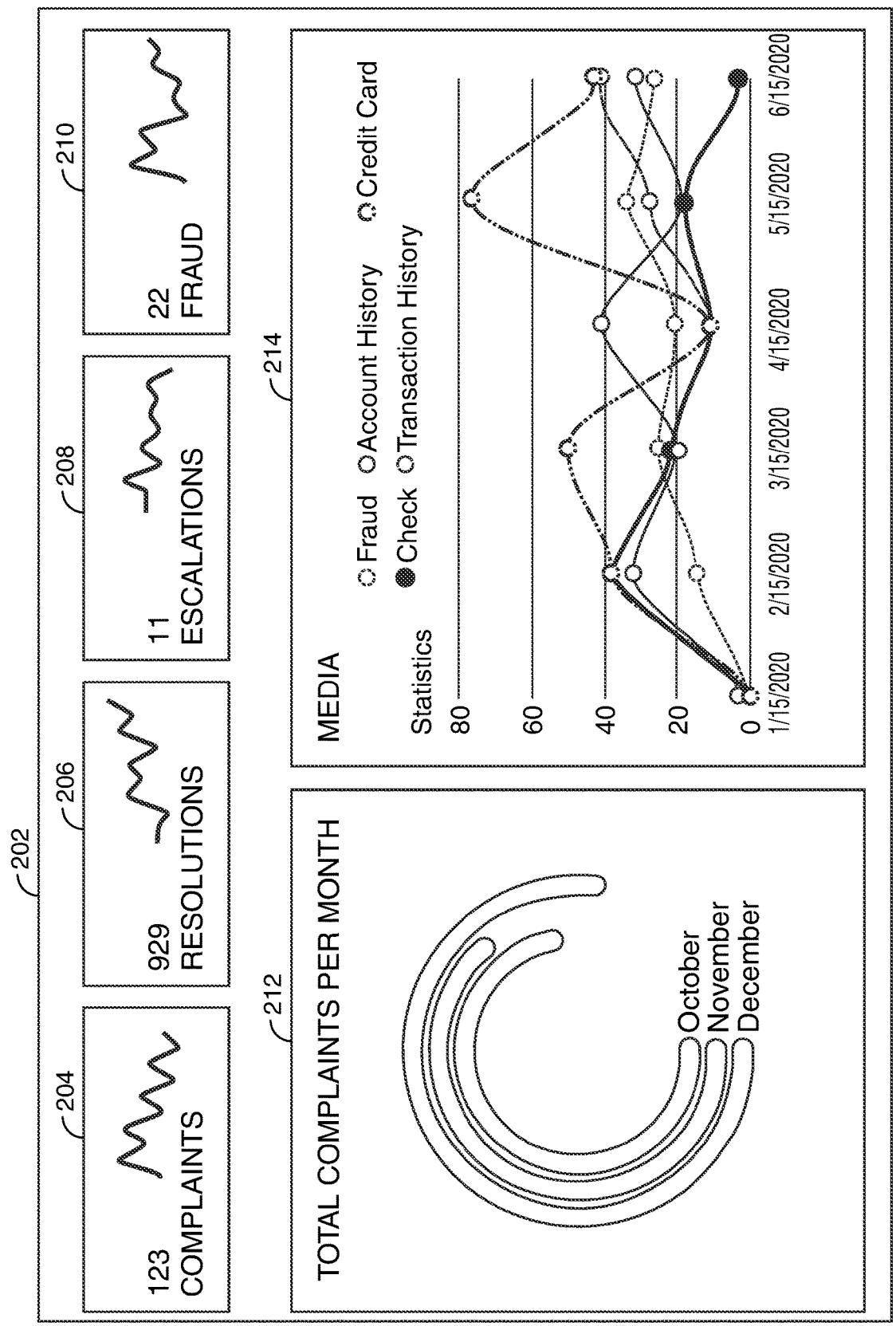
FIG. 2A shows another illustrative diagram in accordance with principles of the disclosure.

FIG. 2A shows an illustrative diagram. The illustrative diagram shows a portion of an illustrative complaint dashboard 202.

Dashboard 202 may include section 204. Section 204 shows, for a predetermined time period, a line graph and a number of audio calls that can be identified as complaints. Complaints may be characterized as audio calls in which the caller completed the call in a dissatisfied manner.

Dashboard 202 may include section 206. Section 206 shows, for a predetermined time period, a line graph and a number of audio calls that can be identified as resolutions. Resolutions may be characterized as audio calls in which the caller completed the call in a satisfied manner.

Dashboard 202 may include section 208. Section 208 shows, for a predetermined time period, a line graph and a number of audio calls that can be identified as escalations. Escalations may be characterized as audio calls in which the caller requested escalation of the call to another department such as a managerial department.

Dashboard 202 may include section 210. Section 210 shows, for a predetermined time period, a line graph and a number of audio calls that can be identified as fraud. Fraud may be characterized as audio calls in which the caller maliciously attempted to deceive the interactive voice response system.

Dashboard 202 may include section 212. Section 212 shows a comparison between the number of complaints per month for three months. The month of November may have the smallest number of complaints. The month of October may have more complaints than the month of November and less complaints than the month of December. The month of December may have the largest number of complaints.

Dashboard 202 may include section 214. Section 214 may show statistical information about audio calls that are related to various forms of media. The various forms of media may include fraud, account history, credit card, check and transaction history. Each line plotted on the graph may show the number of audio calls relating to each of the various forms of media from Jan. 15, 2020 through Jun. 15, 2020. From the graph shown in section 214, trends in the number of calls relating to each type of media may be identified.

Figure 2B:
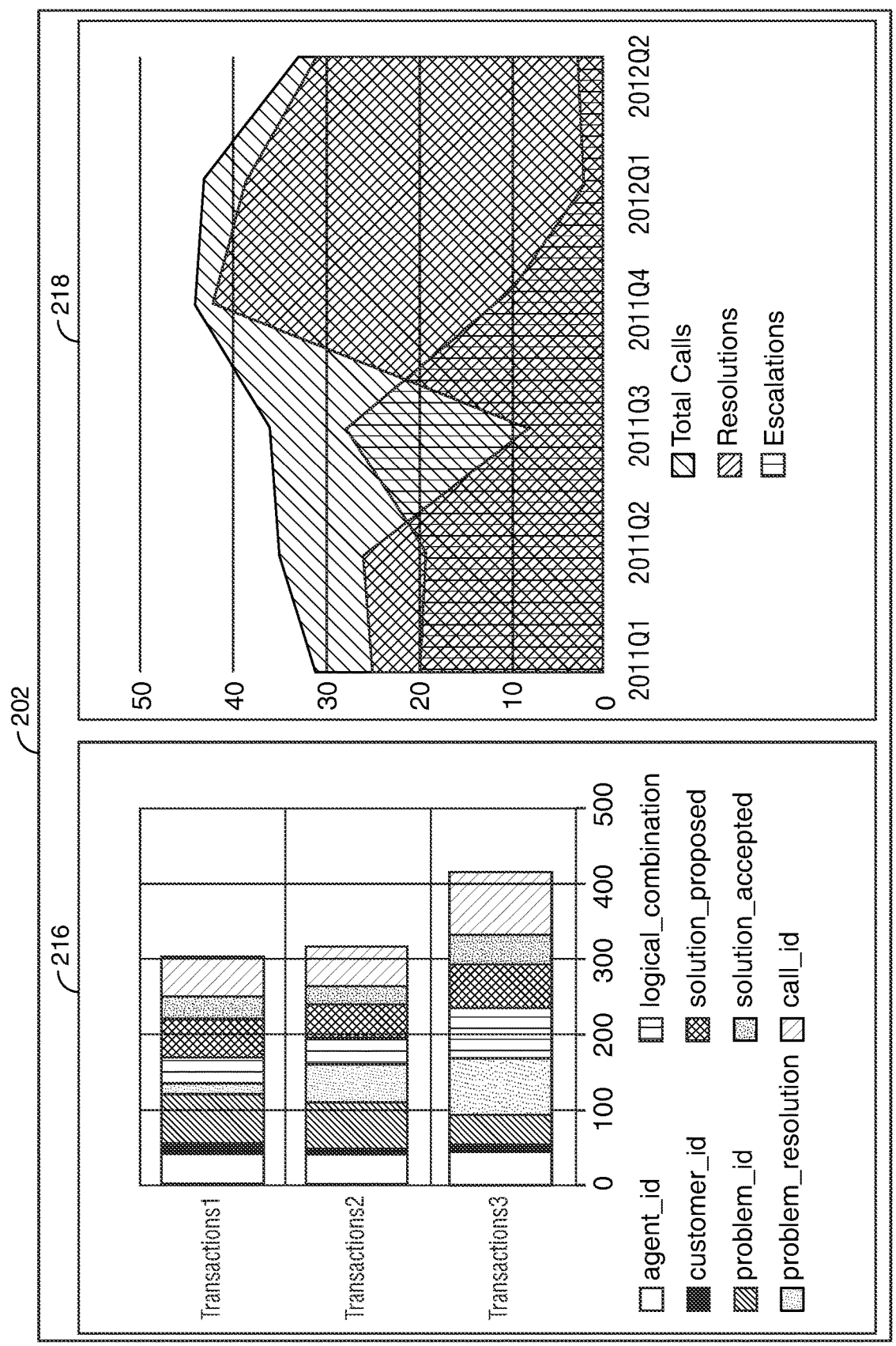
FIG. 2B shows yet another illustrative diagram in accordance with principles of the disclosure.

FIG. 2B shows an illustrative diagram. The illustrative diagram shows another portion of illustrative complaint dashboard 202.

Section 216 shows a bar graph showing three sets of transactions, transactions1, transactions2 and transactions3. Each set of transactions may correspond to a group of audio calls. Each set of transactions may be separated into components, such as agent identifier, customer identifier, problem identifier, problem resolution, logical combination, solutions proposed, solution accepted and call identifier. Each component may form a part of the classification of each audio call or group of audio calls.

Section 218 shows an illustrative graph. The illustrative graph shows audio call details over a year and a half's time period (from quarter 1 of 2011 through quarter 2 of 2012). Section 218 shows the number of calls that were resolved (resolutions) and the number of calls that were escalated and requested managerial assistance (escalations) to the total number of calls that an interactive voice response system received.

Figure 3:
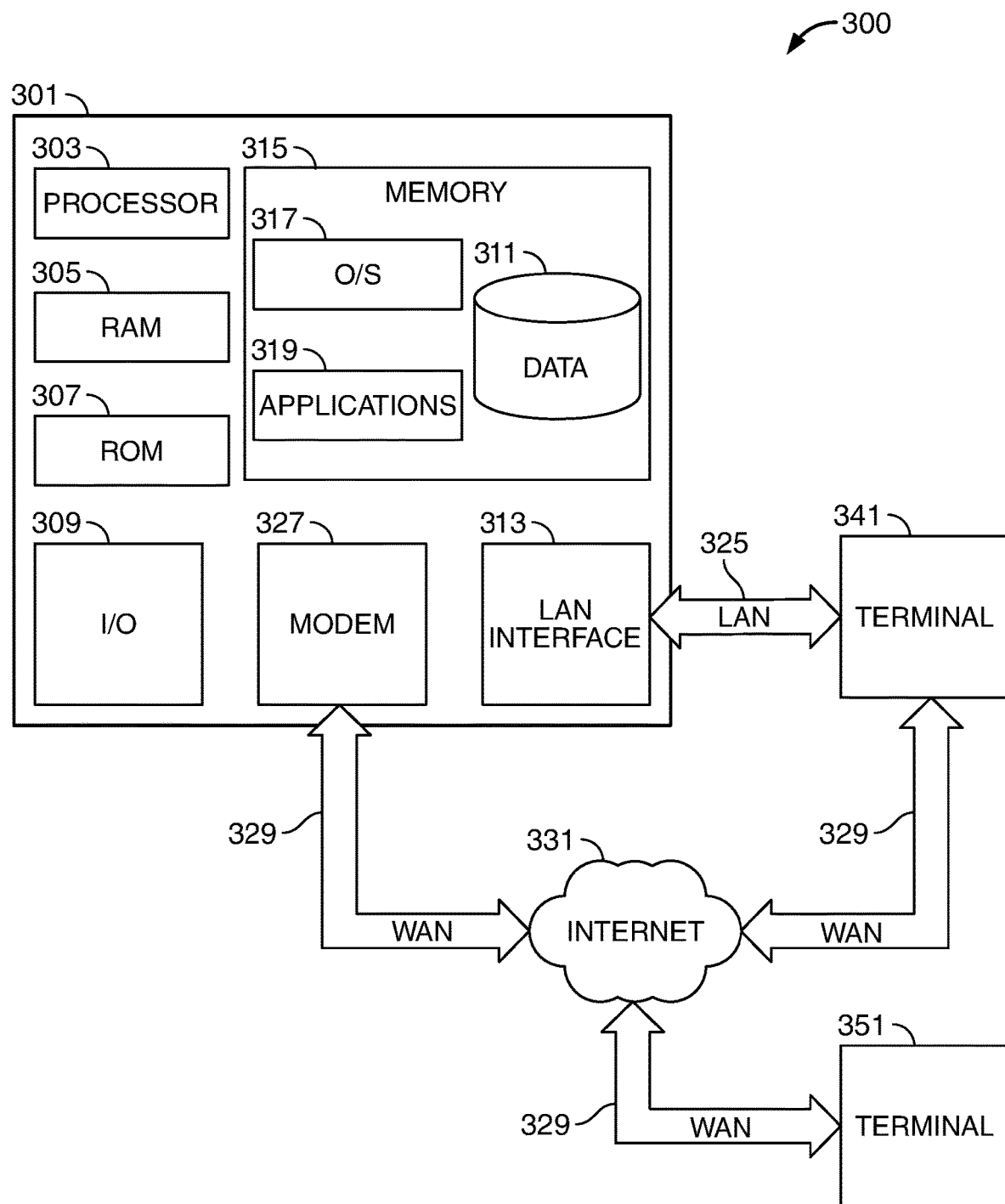
FIG. 3 shows still another illustrative diagram in accordance with principles of the disclosure.

FIG. 3 shows an illustrative block diagram of system 300 that includes computer 301. Computer 301 may alternatively be referred to herein as a "server" or a "computing device." Computer 301 may be a workstation, desktop, laptop, tablet, smart phone, or any other suitable computing device. Elements of system 300, including computer 301, may be used to implement various aspects of the systems and methods disclosed herein.

Computer 301 may have a processor 303 for controlling the operation of the device and its associated components, and may include RAM 305, ROM 307, input/output module 309, and a memory 315. The processor 303 may also execute all software running on the computer—e.g., the operating system and/or voice recognition software. Other components commonly used for computers, such as EEPROM or Flash memory or any other suitable components, may also be part of the computer 301.

The memory 315 may comprise any suitable permanent storage technology—e.g., a hard drive. The memory 315 may store software including the operating system 317 and application(s) 319 along with any data 311 needed for the operation of the system 300. Memory 315 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 301 may execute the instructions embodied by the software to perform various functions.

Input/output ("I/O") module may include connectivity to a microphone, keyboard, touch screen, mouse, and/or stylus through which a user of computer 301 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 300 may be connected to other systems via a local area network (LAN) interface 313.

System 300 may operate in a networked environment supporting connections to one or more remote computers, such as terminals 341 and 351. Terminals 341 and 351 may be personal computers or servers that include many or all of the elements described above relative to system 300. The network connections depicted in FIG. 3 include a local area network (LAN) 325 and a wide area network (WAN) 329, but may also include other networks. When used in a LAN networking environment, computer 301 is connected to LAN 325 through a LAN interface or adapter 313. When used in a WAN networking environment, computer 301 may include a modem 327 or other means for establishing communications over WAN 329, such as Internet 331.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 319, which may be used by computer 301, may include computer executable instructions for invoking user functionality related to communication, such as e-mail, Short Message Service (SMS), and voice input and speech recognition applications. Application program(s) 319 (which may be alternatively referred to herein as "plugins," "applications," or "apps") may include computer executable instructions for invoking user functionality related to performing various tasks. The various tasks may be related to transaction pattern tracking and prediction.

Computer 301 and/or terminals 341 and 351 may also be devices including various other components, such as a battery, speaker, and/or antennas (not shown).

Terminal 351 and/or terminal 341 may be portable devices such as a laptop, cell phone, Blackberry™, tablet, smartphone, or any other suitable device for receiving, storing, transmitting and/or displaying relevant information. Terminals 351 and/or terminal 341 may be other devices. These devices may be identical to system 300 or different. The differences may be related to hardware components and/or software components.

Any information described above in connection with database 311, and any other suitable information, may be stored in memory 315. One or more of applications 319 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 4:
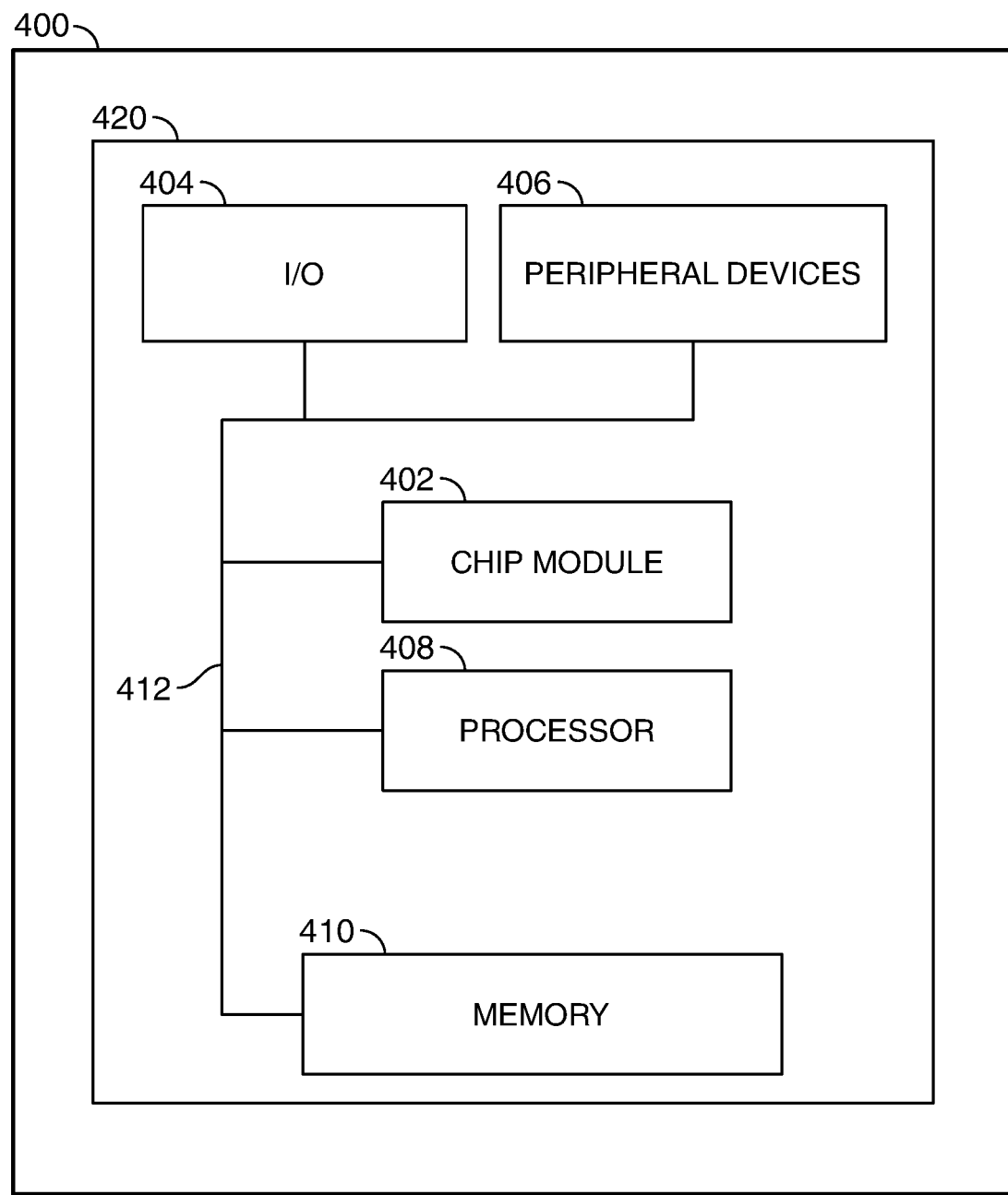
FIG. 4 shows still yet another illustrative diagram in accordance with principles of the disclosure.

FIG. 4 shows illustrative apparatus 400 that may be configured in accordance with the principles of the disclosure. Apparatus 400 may be a computing machine. Apparatus 400 may include one or more features of the apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions (which may be alternatively referred to herein as "computer instructions" or "computer code"), applications, signals, and/or any other suitable information or data structures.

Components 402, 404, 406, 408 and 410 may be coupled together by a system bus or other interconnections 412 and may be present on one or more circuit boards such as 420. In some embodiments, the components may be integrated into a single chip. The chip may be silicon-based.

Thus, systems and methods for an interactive voice response system for use with a real-time complaint identification system and dashboard are provided. Persons skilled in the art will appreciate that the present invention can be practiced by other than the described embodiments, which are presented for purposes of illustration rather than of limitation. The present invention is limited only by the claims that follow.

What is claimed is:

1. An interactive voice response system, supplemented by a complaint differentiation and sentiment model, the interactive voice response system comprising:
   a transceiver unit operable to receive and respond to audio calls;
   an automatic speech recognition system ("ASR") system operable to:
      receive audio calls from the transceiver unit;
      transcribe the received audio calls; and transmit the transcribed audio calls to the complaint differentiation and sentiment model;
the complaint differentiation and sentiment model operable to:
analyze the transcribed audio calls for complaints;
determine that the transcribed audio calls indicated a complaint;
process the transcribed audio calls and identify a first plurality of call components, said first plurality of call components comprising complaint metadata and call content;
transmit the transcribed audio calls that indicated a complaint and the first plurality of call components to an insight dashboard;
the insight dashboard operable to:
display data relating to the transcribed audio calls;
aggregate the first plurality of call components to a second plurality of call components already-stored at the insight dashboard, said second plurality of call components comprising complaint metadata and call content;
display the second plurality of call components;
based on the pluralities of call components, create and display a plurality of graphs, said plurality of graphs comprising:
a complaint graph operable to display a trend in registered complaints per unit time;
a resolution graph operable to display a trend in resolved audio calls per unit time;
an escalation graph operable to display a trend in escalated audio calls per unit time;
a fraud graph operable to display a trend in fraudulent audio calls per unit time,
a statistical graph operable to display a comparison between the registered complaints per unit time, the resolved audio calls per unit time, the escalated audio calls per unit time and the fraudulent calls per unit time; and
a comparison graph operable to compare a total number of audio calls to resolved calls and escalated calls;
using the plurality of graphs to identify one or more audio calls associated with an unresolved complaint; and
the complaint differentiation and sentiment model is further operable to schedule a follow-up communication to a user, associated with the one or more audio calls associated with the unresolved complaint.

2. The interactive voice response system of claim 1 wherein the complaint differentiation and sentiment model analyzing the transcribed calls comprises consideration, in real-time, of content of the audio calls.

3. The interactive voice response system of claim 1 wherein the complaint differentiation and sentiment model analyzing the transcribed calls comprises consideration, in real-time, of metadata relating to the complaint.

4. The interactive voice response system of claim 3 wherein metadata relating to the complaint comprises voice pitch and voice volume.

5. The interactive voice response system of claim 1 wherein the complaint differentiation and sentiment model analyzing the transcribed calls comprises consideration, in real-time of inter-conversational gap as it trends through the audio calls.

6. The interactive voice response system of claim 1 wherein the complaint differentiation and sentiment model analyzing the transcribed calls comprises consideration of a plurality of historical calls.

7. The interactive voice response system of claim 1 wherein the complaint differentiation and sentiment model analyzing the transcribed calls comprises consideration of the content of the transcribed calls being registered by multiple users.

8. The interactive voice response system of claim 1 wherein the complaint differentiation and sentiment model is further operable to register, absent any interaction from a user that initiated the audio call that indicated the complaint, the transcribed audio calls that indicated a complaint with a complaint register, said complaint register stored within the complaint differentiation and sentiment model.

9. The interactive voice response system of claim 1 wherein the follow-up communication is an email, chat and/or telephone call.

10. A method for determining, in real-time, complaint sentiment within conversations between human callers and an interactive voice response system, the method comprising:
receiving and responding to a plurality of audio calls at a hardware transceiver operating with a hardware processor and hardware memory;
transcribing the plurality of audio calls, in real-time, at an automatic speech recognition system, as the plurality of audio calls are received at the hardware transceiver;
transmitting the plurality of transcribed audio calls, in real-time, from the automatic speech recognition system to a complaint differentiation and sentiment model;
analyzing the plurality of transcribed audio calls, in real-time, at the complaint differentiation and sentiment model for a plurality of sentiment factors;
determining, based on the plurality of sentiment factors, that one or more transcribed audio calls of the plurality of transcribed audio calls indicated a complaint in real-time, at the complaint differentiation and sentiment model;
retrieving, from the one or more transcribed audio calls, in real-time, a first plurality of call components at the complaint differentiation and sentiment model;
transmitting, from the complaint differentiation and sentiment model to an insight dashboard, in real-time, the one or more transcribed audio calls and the first plurality of call components, said first plurality of call components comprising complaint metadata and call content;
displaying data, relating to the one or more transcribed audio calls, in real-time, on the insight dashboard;
aggregating the first plurality of call components to a second plurality of call components, said second plurality of call components stored at the insight dashboard, said second plurality of call components comprising complaint metadata and call content;
displaying the second plurality of call components on the insight dashboard;
based on the pluralities of call components, creating and displaying, at the insight dashboard, a plurality of graphs, said plurality of graphs comprising:
a complaint graph operable to display a trend in registered per unit time;
a resolution graph operable to display a trend in resolved audio calls per unit time;
an escalation graph operable to display a trend in escalated audio calls per unit time;

a fraud graph operable to display a trend in fraudulent audio calls per unit time;

a statistical graph operable to display a comparison between the registered complaints per unit time, the resolved audio calls per unit time, the escalated audio calls per unit time and the fraudulent calls per unit time; and a comparison graph operable to compare a total number of audio calls to resolved calls and escalated calls;

identifying, using the plurality of graphs, one or more audio calls associated with an unresolved complaint; and scheduling, at the complaint differentiation and sentiment model, a follow-up communication to a user, associated with the one or more audio calls associated with the unresolved complaint.

11. The method of claim 10 wherein the plurality of sentiment factors comprises call content.

12. The method of claim 10 wherein the plurality of sentiment factors comprises complaint metadata.

13. The method of claim 12 wherein the complaint metadata comprises voice pitch and voice volume.

14. The method of claim 12 wherein the complaint metadata comprises inter-conversational gap as it trends through the call.

15. The method of claim 10 wherein the plurality of sentiment factors comprises a plurality of historical calls.

16. The method of claim 10 wherein the plurality of sentiment factors comprises content of transcribed calls being registered by multiple users.

17. The method of claim 10 further comprising registering, absent any interaction from one or more users that initiated the one or more audio calls that indicated complaint, the one or more transcribed audio calls that indicated complaint with a complaint register, the complaint register stored within the complaint differentiation and sentiment model.

18. The method of claim 10 wherein the follow-up communication is an email, chat or telephone call.

* * * * *